Patented Apr. 13, 1943

2,316,244

UNITED STATES PATENT OFFICE 2,316,244

LEAD CHROMATE PIGMENT

William G. Huckle and Charles G. Polzer, Glens Falls, N. Y., assignors to Imperial Paper and Color Corporation, Glen Falls, N. Y., a corporation of New York No Drawing. Application August 1, 1941, Serial No. 405,077

11 Claims. (Cl. 106—298)

This invention relates to lead chromate pigments, and more particularly to lead chromate pigments having improved resistance to color deterioration by the action of light and weather. The invention contemplates an improved treatment for increasing the color fastness of lead chromate pigments as well as the improved lead chromate pigments obtained in accordance with this treatment.

Lead chromate pigments have a tendency to deteriorate in color when exposed to the action of light and atmospheric weather conditions. These lead chromate pigments, as referred to herein and in the claims, include not only pure lead chromate but mixtures of lead chromate with lead sulphate, with aluminum compounds and with other materials which are used in the commercial manufacture of "chrome yellows," "chrome oranges," and the like, and also mixtures of lead chromate pigments with other pigments, such as blue iron ferrocyanide which is mixed with lead chromate pigments to produce "chrome greens." Attempts to increase the color fastness of such lead chromate pigments by the precipitation thereon of various insoluble metallic hydroxides and salts have not been wholly satisfactory. It has been proposed to treat lead chromate pigments with water-soluble stannous salts and soluble metal sulphides and polysulphides. However, the soluble stannous salts are not readily available and are expensive, and the treatment of lead chromate pigments with soluble metal sulphides or polysulphides has a deleterious effect on the tone of the pigment color.

We have discovered that by reacting trivalent antimony compounds with lead chromate pigments the resistance of such pigments to color deterioration by the action of light and weather is materially increased. Based on this discovery, our present invention comprises subjecting lead chromate pigments in the presence of an aqueous medium to the action of a trivalent antimony compound. The resulting lead chromate pigment having increased color fastness comprises the lead chromate pigment having formed thereon an effective amount of a reaction product resulting from the reaction between the lead chromate and the trivalent antimony compound.

The trivalent, or antimonous, compounds which we have found to be effective for the practice of our invention comprise antimony compounds in which the antimony has a valence lower than 5. The term "trivalent," or "antimonous," is used herein and in the claims to embrace all such antimony compounds having a valence lower than 5, this designation having been chosen in view of the fact that of such antimony compounds those in which the antimony has a valence of 3 are most common. As examples of such antimony compounds, we have found that trivalent (or antimonous) halides, such for example as antimony trichloride (SbCl$_3$), and antimonous sulphate may be used with particular advantage. Both soluble and insoluble trivalent antimony compounds may be used effectively, the insoluble antimony compounds, if used, being rendered soluble by the action of an appropriate acid or salt.

The lead chromate pigment is subjected to the action of the trivalent antimony compound in the presence of an aqueous medium. For example, the antimony compound may be added to an aqueous suspension of the lead chromate pigment, either before or after the addition thereto of any other pigment ultimately to be incorporated with the lead chromate pigment, or the antimony compound may be mixed into a pulp of lead chromate pigment obtained by filtering an aqueous suspension of the pigment. In the now preferred practice of our invention, the treatment of the lead chromate pigment is carried out at a pH of about 3.5 to about 6.5. Within this range, we have found that a pH of about 4 to 5 is particularly advantageous.

The amount of trivalent antimony compound used in the practice of our invention may vary over a considerable range. In general, an amount of the antimony compound from about 0.5% to about 10% by weight of the lead chromate is effective, the percentage of antimony compound referred to herein and in the claims being calculated as the equivalent amount of SbCl$_3$. The antimony compounds are generally not effective if used in an amount less than about 0.5% and amounts in excess of about 10% are unnecessary. About 4% of the antimony compound has been found in actual practice to be particularly effective. With the use of from about 0.5% to about 4% of the antimony compound the color fastness of the treated lead chromate pigment increases substantially, but the degree of color fastness of the treated pigment increases at a lesser rate as amounts of the antimony compound substantially in excess of about 4% are used.

The following examples illustrate the practice of our invention:

Example I

About 88 pounds of antimony trichloride were dissolved in 100 gallons of water, and the resulting solution was added to a suspension of 2000 pounds of lead chromate pigment suspended in 4000 gallons of water. The pH of the suspension before addition of the antimony trichloride solution was 4.5. Following agitation of the mixture to insure thorough contact between the antimony trichloride and the suspended pigment, the mass was filtered and the pigment was dried in the usual manner.

*Example II*

About 35 pounds of antimony oxide were added to a mixture of 100 pounds of 20° Bé. hydrochloric acid and 100 gallons of water. The resulting aqueous mixture was added to a suspension of 1000 pounds of lead chromate pigment in 3000 gallons of water, and the pH of the resulting mass was adjusted to 4.2. Following adjustment of the pH and agitation of the mass to insure thorough contact between the antimony compound and the pigment, 200 pounds of iron blue pigment suspended in 2000 gallons of water were added to the lead chromate suspension. Processing of the resulting "chrome green" pigment was completed in the usual manner.

*Example III*

About 30 pounds of antimonous sulphate were thoroughly mixed with a suspension of 700 pounds of lead chromate pigment and 300 pounds of iron blue pigment in 5000 gallons of water. The pH of the mass was adjusted to 4.8, and the resulting "chrome green" pigment was processed in accordance with conventional practice.

Each of the lead chromate pigments prepared as described in the foregoing examples was characterized by marked resistance to the effect of light and weather. The tone of these color-fast lead chromate pigments was not appreciably affected by the treatment with the antimonous compound, and the colors were clear and true. Moreover, antimonous compounds are comparatively inexpensive and readily obtained.

We claim:

1. In the treatment of lead chromate pigments for increasing their resistance to color deterioration by the action of light, the improvement which comprises subjecting the lead chromate pigment in the presence of an aqueous medium to the action of a trivalent antimony compound.

2. In the treatment of lead chromate pigments for increasing their resistance to color deterioration by the action of light, the improvement which comprises subjecting the lead chromate pigment in the presence of an aqueous medium to the action of a trivalent antimony compound in an amount of about 0.5–10% by weight of the lead chromate.

3. In the treatment of lead chromate pigments for increasing their resistance to color deterioration by the action of light, the improvement which comprises subjecting the lead chromate pigment in the presence of an aqueous medium to the action of a trivalent antimony compound in an amount of about 4% by weight of the lead chromate.

4. In the treatment of lead chromate pigments for increasing their resistance to color deterioration by the action of light, the improvement which comprises subjecting the lead chromate pigment in the presence of an aqueous medium having a pH of about 3.5–6.5 to the action of a trivalent antimony compound.

5. In the treatment of lead chromate pigments for increasing their resistance to color deterioration by the action of light, the improvement which comprises subjecting the lead chromate pigment in the presence of an aqueous medium having a pH of about 3.5–6.5 to the action of a trivalent antimony compound in an amount of about 0.5–10% by weight of the lead chromate.

6. In the treatment of lead chromate pigments for increasing their resistance to color deterioration by the action of light, the improvement which comprises subjecting the lead chromate pigment in the presence of an aqueous medium to the action of an antimonous halide.

7. In the treatment of lead chromate pigments for increasing their resistance to color deterioration by the action of light, the improvement which comprises subjecting the lead chromate pigment in the presence of an aqueous medium to the action of antimony trichloride.

8. In the treatment of lead chromate pigments for increasing their resistance to color deterioration by the action of light, the improvement which comprises subjecting the lead chromate pigment in the presence of an aqueous medium to the action of antimonous sulphate.

9. In the treatment of lead chromate pigments for increasing their resistance to color deterioration by the action of light, the improvement which comprises subjecting the lead chromate pigment in the form of an aqueous suspension to the action of a trivalent antimony compound.

10. In the treatment of lead chromate pigments for increasing their resistance to color deterioration by the action of light, the improvement which comprises subjecting the lead chromate pigment to the action of an aqueous mixture of antimony oxide and hydrochloric acid.

11. A lead chromate pigment having increased resistance to color deterioration by the action of light comprising a lead chromate pigment having formed thereon an effective amount of a reaction product resulting from the reaction in an aqueous medium of lead chromate and a trivalent antimony compound.

WILLIAM G. HUCKLE.
CHARLES G. POLZER.